(12) United States Patent
Chan et al.

(10) Patent No.: US 7,694,116 B2
(45) Date of Patent: Apr. 6, 2010

(54) TEST METHOD FOR VERIFYING INSTALLATION VALIDITY OF A PCI DEVICE ON A ELECTRONIC DEVICE

(75) Inventors: Hoi Chan, Tu-Cheng (TW); Li-Chuan Qiu, Shenzhen (CN); Qing-Long Chai, Shenzhen (CN); Yu-Hao Wu, Shenzhen (CN); Ru-Da Xu, Shenzhen (CN); Yue Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 641 days.

(21) Appl. No.: 11/309,885

(22) Filed: Oct. 17, 2006

(65) Prior Publication Data

US 2008/0091859 A1    Apr. 17, 2008

(51) Int. Cl.
*G06F 11/00* (2006.01)
(52) U.S. Cl. .................. 713/1; 713/2; 714/37; 714/43; 714/46; 714/47; 714/56
(58) Field of Classification Search ............... 713/1–2; 714/37, 43, 46, 47, 56
See application file for complete search history.

(56) References Cited

U.S. PATENT DOCUMENTS

| | | | | |
|---|---|---|---|---|
| 6,175,889 B1 * | 1/2001 | Olarig | | 710/309 |
| 6,311,242 B1 * | 10/2001 | Falkenburg et al. | | 710/301 |
| 6,643,811 B1 | 11/2003 | Chambers | | |
| 7,434,112 B2 * | 10/2008 | Chen et al. | | 714/56 |
| 7,506,083 B1 * | 3/2009 | Lemke et al. | | 710/48 |

* cited by examiner

*Primary Examiner*—Abdelmoniem Elamin
(74) *Attorney, Agent, or Firm*—Wei Te Chung

(57) ABSTRACT

A test method for verifying installation validity of a peripheral component interconnected (PCI) devices on an electronic device having a test module, comprises the steps of: (a) storing information of onboard devices and slots on motherboards of different electronic devices and information of PCI devices added in the slots of the motherboards in a first data storing device; (b) storing a bill of material (BOM) showing all possible configurations of the different computers in a second data storing device; (c) generating a configuration file according to the BOM and information of the motherboards and PCI devices; (d) the test module in the computer checking actual hardware configuration of the computer and comparing the actual configuration with the corresponding information recorded in the configuration file; (e) outputting a test result.

8 Claims, 4 Drawing Sheets

TEST METHOD FOR VERIFYING INSTALLATION VALIDITY OF A PCI DEVICE ON A ELECTRONIC DEVICE

FIELD OF THE INVENTION

The present invention relates to test methods for verifying installation validity of a device, particularly to a test method for testing installation validity of a Peripheral Component Interconnected (PCI)/PCI Express device on an electronic device.

DESCRIPTION OF THE RELATED ART

After a PCI device such as a video card, a sound card, or a network card is installed on a computer, a test for verifying installation validity of the PCI device on the computer is needed. A conventional test method for verifying installation validity of a PCI device on a computer is provided by accessing the routing table in the Basic Input/Output System (BIOS), for getting the slot information of a computer, thereby verifying installation validity of the PCI device in the slot. However, this test method needs an integrated routing table to be recorded in the BIOS. But in actuality, some slot (such as an Accelerated Graphics Port) information of the computer is not recorded in the routing table, therefore, the installation validity of the PCI devices on the missed slots cannot be verified.

Another conventional test method for verifying installation validity of a PCI device on a computer is provided by comparing a bus number, device number, and function number of the PCI devices with the corresponding information in a configuration file. Because the bus, device, and function numbers of the PCI are determined by the actual hardware configuration of the computer, it is necessary to first set up a computer according to the configuration. The configuration file is generated by the computer according to the configuration information. If some components of the computer can be replaced by alternative components, then operators must set up each computer according to all possible configurations of the computer and repeat generating configuration file for each configuration. This method relies too much on the operators, is not efficient, and may give rise to mistakes.

What is needed, therefore, is a test method for automatically verifying installation of PCI devices on an electronic device.

SUMMARY OF THE INVENTION

A test method for verifying installation validity of a peripheral component interconnected (PCI) devices on an electronic device having a test module, comprises the steps of: (a) storing information of onboard devices and slots on motherboards of different electronic devices and information of PCI devices added in the slots of the motherboards in a first data storing device; (b) storing a bill of material (BOM) showing all possible configurations of the different computers in a second data storing device; (c) generating a configuration file according to the BOM and information of the motherboards and PCI devices; (d) the test module in the computer checking actual hardware configuration of the computer and comparing the actual configuration with the corresponding information recorded in the configuration file; (e) outputting a test result.

Other advantages and novel features will be drawn from the following detailed description of preferred embodiments with attached drawings, in which:

DETAILED DESCRIPTION OF THE INVENTION

Figure 1:
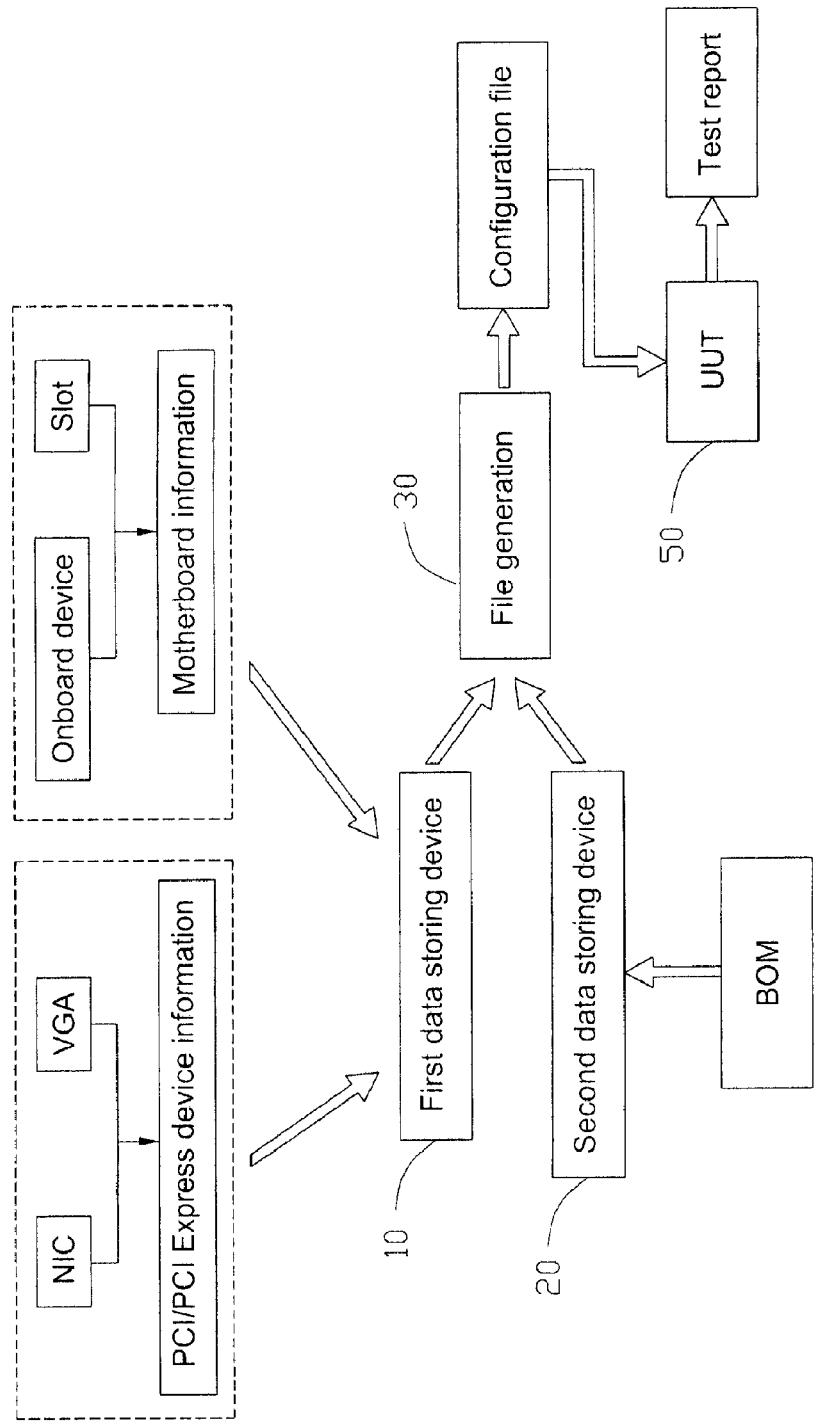
FIG. 1 is a chart showing configuration of a test system for verifying installation validity of a PCI/PCI Express device on an electronic device in accordance with a preferred embodiment of the present invention.

Referring to FIG. 1, a test system for verifying installation validity of a PCI/PCE Express device on an electronic device in accordance with a preferred embodiment includes a first data storing device 10, a second data storing device 20, a file generator 30 for generating a configuration file, and a unit under test (UUT) 50. The first data storing device 10 is for storing motherboard information (including information of on board device and slot) and PCI/PCI Express device (such as NIC and VGA) information. The second data storing device 20 is for storing a bill of material (BOM) recording all possible hardware configurations of different electronic devices or Stock Keeping Units (SKU), such as a personal computer. The motherboard information, the PCI/PCI Express device information, and the BOM can also be stored in one data storing device. The file generator 30 is connected to the first data storing device 10, the second data storing device 20, and the UUT 50 via network, for generating a configuration file according to the motherboard information, PCI/PCI Express information, and the BOM, and transmitting the configuration file to the UUT 50. The UUT 50 includes at least one computer having a test module. Some PCI/PCI Express devices are added on the computer. The test module is used for testing installation validity of the PCI/PCI Express device on the computer. After all PCI/PCI Express devices are tested, the UUT 50 generates a test report. The information of the motherboard and PCI/PCI Express device is stored in the first data storing device 10.

Figure 2:
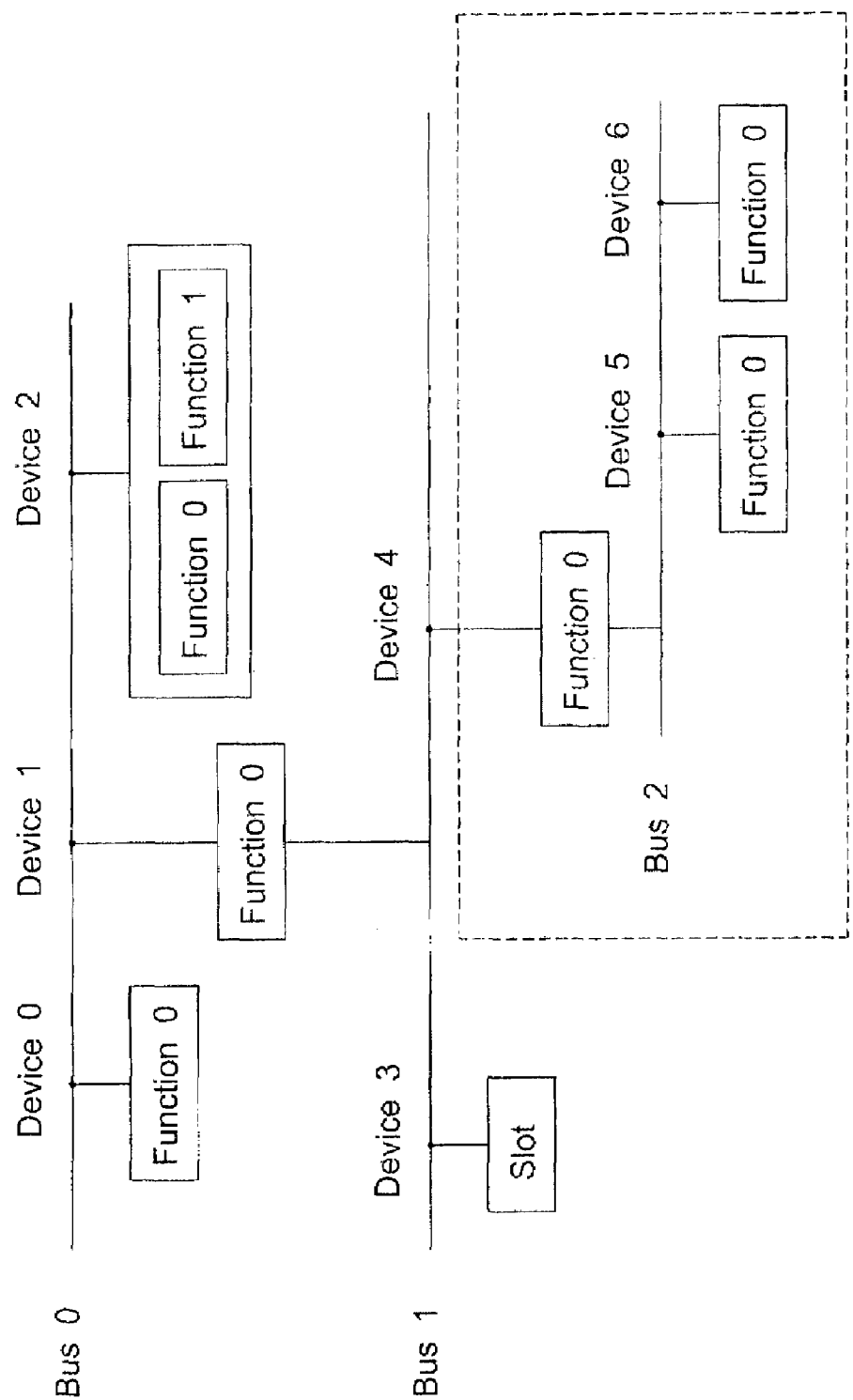
FIG. 2 is a tree chart showing paths of PCI/PCI express devices mounted on the computer.

Referring also to FIG. 2, a PCI/PCI Express device tree is used for showing general mounting positions of the PCI/PCI Express devices in a computer system. A PCI/PCI Express device tree in accordance with one embodiment includes a primary bus 0, a bus 1, and a bus 2. Devices 0, 1, and 2 on the primary bus 0 are onboard devices. Device 1 is a PCI Bridge. The path of the PCI Bridge is designated by a combination of a device number and a function number. The function number of device 0 and device 1 is 0. The function numbers of device 2 are 0 and 1. Devices 3 and 4 are on bus 1. The device 3 on bus 1 is a currently empty slot for receiving a PCI device. The device 4 is a slot with a TV Tuner card therein. The TV Tuner card includes a PCI bridge connecting bus1 and bus2 together. The function number of the devices 3 and 4 is 0. A device 5 and a device 6 are on bus 2. The function number of the devices 5 and 6 is 0. The path of a PCI/PCI Express device is presented by a combination of a bus number, a PCI Bridge path, and a device number. For example, the path of the device 3 is represented by "B0D1F0D3".

Figure 3:
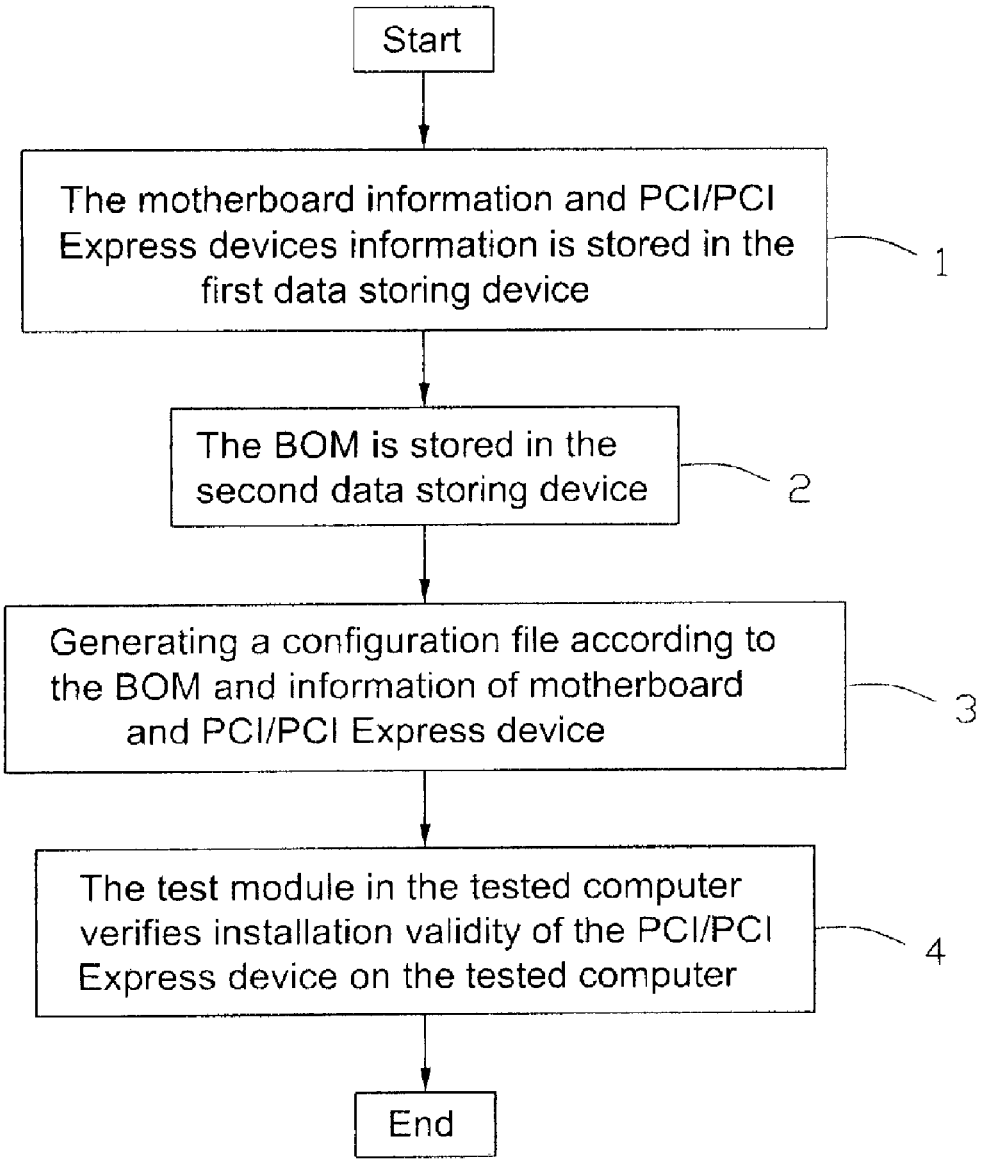
FIG. 3 is a flow chart of a test method for verifying installation validity of a PCI/PCE Express device on an electronic device in accordance with a preferred embodiment of the present invention.

Referring also to FIG. 3, the test method for verifying installation validity of a PCI/PCI Express device on a computer includes following steps:

Step 1: Motherboard information and PCI/PCI Express devices information is stored in the first data storing device 10. The motherboard information includes information of onboard devices and slots on the motherboard for the PCI/PCI Express devices inserted therein. The onboard devices information includes the paths of the onboard devices, the function numbers of the onboard devices, information on manufacturers of the onboard devices, and other information about the onboard device. The paths of the onboard device are represented by bus numbers and device numbers. For example, the path of the device 2 on the bus 0 is represented by "B0D2". The slots information includes the paths of slots, the bus number of the slots, and the function numbers of the slots, etc. The path of the slot (device 4) on bus 1 is represented by "B0D1F0D4". The PCI/PCI Express device information includes relative paths, bus numbers, device numbers, and function numbers of the PCI/PCI Express devices, etc. In the FIG. 2, the bus 0 is connected to bus 1 via a PCI Bridge, but the bus 0 may also be connected to other buses via other PCI Bridges (not shown). When the bus 0 is connected to more than one bus via different PCI bridges, we cannot fix which one is bus 1 and which one is bus 2. And the same thing may happen on bus 1 or bus 2 in the FIG. 2. That is, except the primary bus 0, the numbers of other buses are not fixed when the configuration file is generated, because of the PCI Bridge in the PCI/PCI Express device. Therefore, a relative path is used to represent the mounting position of the PCI device on the motherboard. And a code "0xff" is used to represent the unfixed bus number. The relative path is stored in the configuration file. Before the test process is started, the test module will find the actual bus numbers of the PCI device added on the motherboard, and the code "0xff" in the relative path will be replaced by the actual bus number. The relative path is represented by a combination of the path of the PCI Bridge and the device number and function number of the determined PCI device connected to the PCI Bridge. For instance, the function 0 of device 5 in FIG. 2 is described as relative path "F0D5F0". An absolute path of a PCI/PCI device is represented by a combination of the path of a slot on the motherboard and the relative path of the PCI/PCI Express device, for representing the mounting position of the PCI/PCI Express device in the computer system.

Step 2: The BOM is stored in the second data storing device.

Step 3: The test system generates a configuration file according to the BOM and information of motherboard and PCI/PCI Express devices. When one type of computer is tested, the information in the configuration file corresponding to the type of computer is selected to be compared with the actual computer hardware configuration. The configuration file include paths, bus numbers, device numbers and function numbers of the slots on the motherboard and names, paths, bus numbers, device numbers and function numbers of the PCI/PCI Express devices.

Step 4: The test module in the UUT 50 verifies installation validity of the PCI/PCI Express device on the computer.

Figure 4:
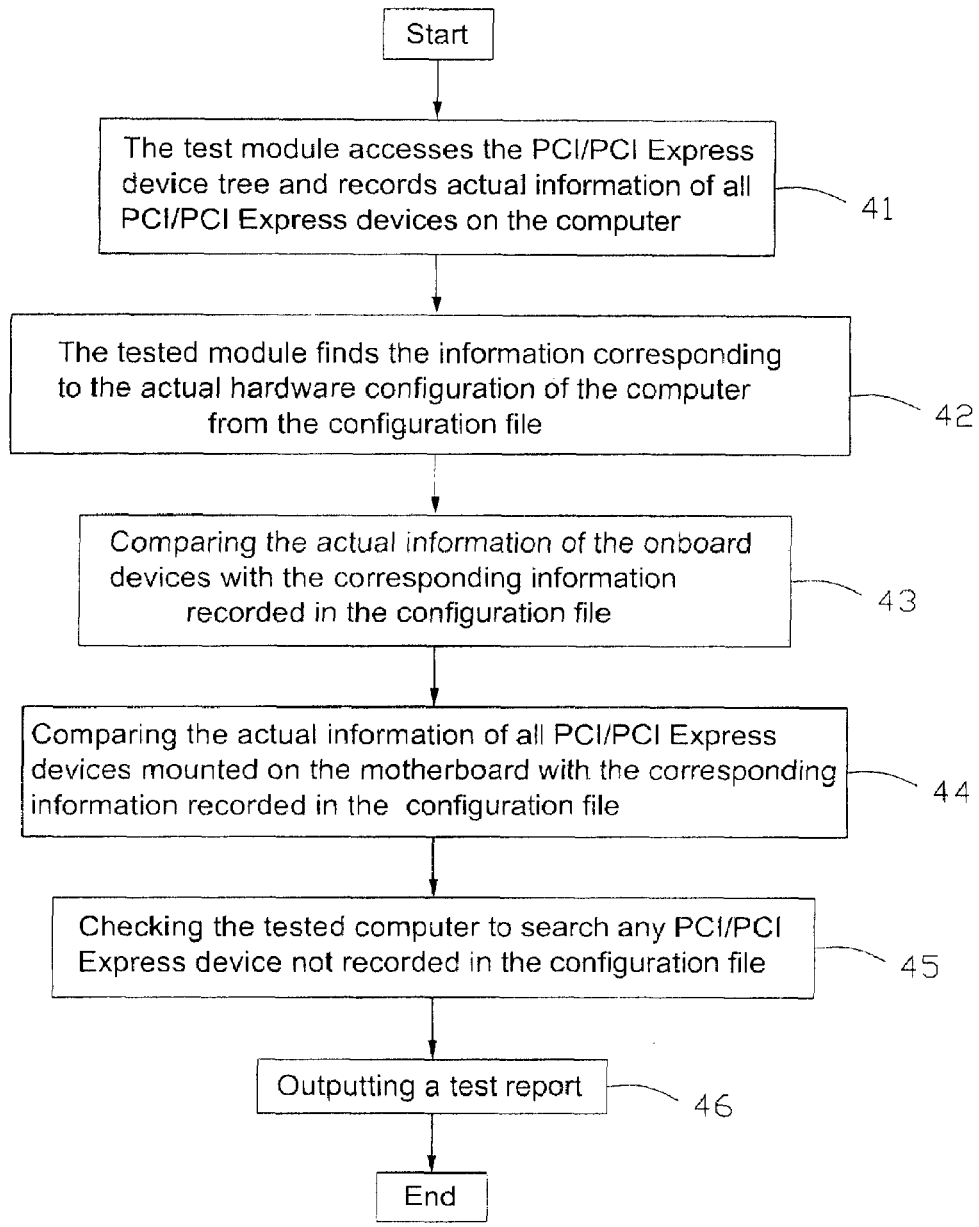
FIG. 4 is a detailed flow chart of one step of the test method in FIG. 3.

Referring to FIG. 4, the detailed test method of step 4 is described as follows:

Step 41: The test module accesses the PCI/PCI Express device tree and records actual information of all PCI/PCI Express devices on the computer. In the accessing process, the test module finds the device numbers and function numbers of the PCI Bridges on the primary bus for getting the bus number of a secondary bus, which is connected to the PCI Bridge. The process is repeated until all PCI/PCI Express devices on the computer are found.

Step 42: The test module finds the information corresponding to the actual hardware configuration of the computer from the configuration file. The unfixed bus numbers of the PCI/PCI Express devices in the configuration file are dynamically amended to the actual bus number checked by the test module.

Step 43: Comparing the actual information of the onboard devices checked by the test module with that recorded in the configuration file, and processing the result of the comparison.

Step 44: Comparing the actual information of all PCI/PCI Express devices added in the slots of the motherboard with the corresponding information recorded in the configuration file, and processing the result of the comparison.

Step 45: Checking the UUT 50 to search for any PCI/PCI Express device not recorded in the configuration file.

Step 46: Outputting a test report.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A test system for verifying installation validity of peripheral component interconnected (PCI) devices on an electronic device, comprising:
   a first data storing device configured for recording information of motherboards and PCI devices added on the motherboards of different electronic devices;
   a second data storage device configured for recording a Bill of Material (BOM) showing all possible configurations of the different electronic devices;
   a file generator connected to the first and second data storing device and configured for generating a configuration file according to the information and BOM of the data storing device; and
   at least one electronic device having a test module connected to the file generator, the test module being configured for checking actual configuration of the computer and comparing the actual configuration with the corresponding information in the configuration file; wherein the test module accesses a PCI device tree for getting and recording the information of the PCI devices on the computer, arid dynamically amends a corresponding unfixed bus number of the PCI device in the configuration file according to the actual bus number.

2. A test method for verifying installation validity of Peripheral Component Interconnected (PCI) devices on an electronic device having a test module, comprising the steps of:
   (a) storing information of onboard devices and slots on motherboards of different electronic devices and information of PCI devices added in the slots in a first data storing device;
   (b) storing a Bill of Material (BOM) showing all possible configurations of the different electronic devices in a second data storing device;
   (c) generating a configuration file according to the BOM and information of the motherboards and PCI devices;
   (d) checking actual hardware configuration of the electronic device and comparing the actual configuration with the corresponding information in the configuration file, for verifying installation validity of the PCI/PCI Express device on the electronic device, wherein the test module accesses a PCI device tree for getting and recording the information of the PCI devices on the computer and dynamically amends a corresponding unfixed bus number of the PCI device in the configuration file according to the actual bus number; and (e) outputting a lest result.

3. The test method for verifying installation validity of PCI devices on a electronic device as described in claim 2, wherein the step (d) further comprises steps of:

checking the actual information of onboard devices and comparing with the corresponding information recorded in the configuration file;

checking the actual information of all PCI devices added in the slots of the motherboard and comparing with the corresponding information recorded in the configuration file; and checking the computer to search any PCI/PCI device not recorded in the configuration file.

4. The test method for verifying installation validity of PCI devices on an electronic device as described in claim 3, wherein the step of accessing the PCI device tree further comprises the steps of:

finding the device number and function number of a PCI Bridge on a primary bus using the test module;

getting a bus number of a secondary bus connected to the PCI bridge according to the device number and function number of the PCI Bridge; and repeating the aforesaid steps until all PCI devices on the tree are found.

5. The test method for verifying installation validity of PCI devices on an electronic device as described in claim 3, wherein the configuration file comprises absolute paths for showing mounting positions of the PCI/PCI Express devices, each path is represented by a combination of a path of a slot on the motherboard and a relative path of the PCI/PCI Express device added in the slot.

6. The test method for verifying installation validity of PCI devices on an electronic device as described in claim 5, wherein the relative path of the PCI/PCI Express device is represented by a combination of a path of a PCI Bridge, and a device number and function number of the PCI/PCI Express device connected to the PCI Bridge.

7. The test method for verifying installation validity of PCI devices on an electronic device as described in claim 2, wherein the configuration file are generated by a file generator connected to the first and second data storing device.

8. The test method for verifying installation validity of PCI devices on an electronic device as described in claim 2, wherein the information of an board devices and slots on the motherboard and PCI devices is stored in the data storing device in an extensible markup language form.

* * * * *